(12) United States Patent
McCaffrey (10) Patent No.: US 10,422,240 B2
(45) Date of Patent: Sep. 24, 2019

(54) TURBINE ENGINE BLADE OUTER AIR SEAL WITH LOAD-TRANSMITTING COVER PLATE

(71) Applicant: United Technologies Corporation, Farmington, CT (US)

(72) Inventor: Michael G. McCaffrey, Windsor, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 733 days.

(21) Appl. No.: 15/071,299

(22) Filed: Mar. 16, 2016

(65) Prior Publication Data

US 2017/0268364 A1    Sep. 21, 2017

(51) Int. Cl.
| | |
|---|---|
| F01D 11/08 | (2006.01) |
| F01D 9/04 | (2006.01) |
| F01D 25/24 | (2006.01) |
| F01D 5/28 | (2006.01) |
| F01D 11/12 | (2006.01) |

(52) U.S. Cl.
CPC .............. *F01D 11/08* (2013.01); *F01D 5/284* (2013.01); *F01D 9/04* (2013.01); *F01D 9/041* (2013.01); *F01D 11/12* (2013.01); *F01D 11/122* (2013.01); *F01D 25/24* (2013.01); *F01D 25/246* (2013.01); *F05D 2220/32* (2013.01); *F05D 2230/60* (2013.01); *F05D 2240/11* (2013.01); *F05D 2260/30* (2013.01); *F05D 2300/131* (2013.01); *F05D 2300/17* (2013.01); *F05D 2300/20* (2013.01); *Y02T 50/672* (2013.01)

(58) Field of Classification Search
None
See application file for complete search history.

(56) References Cited

U.S. PATENT DOCUMENTS

| | | | | |
|---|---|---|---|---|
| 3,800,864 | A | * | 4/1974 | Hauser .................... F01D 25/12 165/47 |
| 4,087,199 | A | | 5/1978 | Hemsworth et al. |
| 4,157,232 | A | * | 6/1979 | Bobo ...................... F01D 11/08 415/116 |
| 4,303,371 | A | * | 12/1981 | Eckert .................... F01D 11/08 415/116 |

(Continued)

FOREIGN PATENT DOCUMENTS

| | | |
|---|---|---|
| EP | 2613015 | 7/2013 |
| WO | 2015038341 | 3/2015 |

(Continued)

OTHER PUBLICATIONS

Extended European Search Report for European Patent Application No. 17160058.8 completed Jul. 6, 2017.

(Continued)

*Primary Examiner* — Kayla Mccaffrey
(74) *Attorney, Agent, or Firm* — Carlson, Gaskey & Olds, P.C.

(57) ABSTRACT

A seal assembly includes a seal arc segment that defines radially inner and outer sides and first and second axial arc segment sides, a carriage that carries the seal arc segment, and a cover that defines first and second axial cover sides. The second axial cover side is adjacent the first axial arc segment side.

16 Claims, 4 Drawing Sheets

(56) References Cited

U.S. PATENT DOCUMENTS

| | | | |
|---|---|---|---|
| 4,527,385 A | 7/1985 | Jumelle et al. | |
| 4,728,257 A | 3/1988 | Handschuh | |
| 5,092,735 A * | 3/1992 | Katy | F01D 11/08 415/115 |
| 5,609,469 A | 3/1997 | Worley et al. | |
| 5,639,210 A | 6/1997 | Carpenter et al. | |
| 6,142,731 A | 11/2000 | Dewis et al. | |
| 6,431,825 B1 | 8/2002 | McLean | |
| 6,726,448 B2 | 4/2004 | McGrath et al. | |
| 6,733,235 B2 | 5/2004 | Alford et al. | |
| 7,052,235 B2 | 5/2006 | Alford et al. | |
| 7,163,206 B2 | 1/2007 | Cross et al. | |
| 7,261,300 B2 * | 8/2007 | Agrawal | F16C 17/042 277/399 |
| 7,435,049 B2 | 10/2008 | Ghasripoor et al. | |
| 7,527,472 B2 | 5/2009 | Allen | |
| 7,959,407 B2 | 6/2011 | Tholen | |
| 8,123,466 B2 | 2/2012 | Pietraszkiewicz et al. | |
| 8,303,247 B2 | 11/2012 | Schlichting et al. | |
| 8,439,636 B1 | 5/2013 | Liang | |
| 8,534,995 B2 | 9/2013 | McCaffrey | |
| 8,568,091 B2 | 10/2013 | McCaffrey | |
| 8,585,357 B2 | 11/2013 | DiPaola et al. | |
| 8,596,963 B1 | 12/2013 | Liang | |
| 8,790,067 B2 | 7/2014 | McCaffrey et al. | |
| 8,814,507 B1 * | 8/2014 | Campbell | F01D 5/08 415/173.1 |
| 8,876,458 B2 | 11/2014 | Thibodeau et al. | |
| 8,920,127 B2 | 12/2014 | McCaffrey | |
| 8,944,756 B2 | 2/2015 | Lagueux | |
| 9,039,358 B2 | 5/2015 | Tholen et al. | |
| 9,115,596 B2 | 8/2015 | Clouse | |
| 9,169,739 B2 | 10/2015 | Mironets et al. | |
| 9,200,530 B2 | 12/2015 | McCaffrey | |
| 9,228,447 B2 | 1/2016 | McCaffrey | |
| 2005/0058540 A1 | 3/2005 | Diakunchak | |
| 2006/0038358 A1 | 2/2006 | James | |
| 2008/0211192 A1 | 9/2008 | Pietraszkiewicz et al. | |
| 2009/0096174 A1 | 4/2009 | Spangler et al. | |
| 2009/0169368 A1 | 7/2009 | Schlichting et al. | |
| 2009/0208322 A1 | 8/2009 | McCaffrey | |
| 2009/0269188 A1 | 10/2009 | Martin | |
| 2010/0226760 A1 | 9/2010 | McCaffrey | |
| 2011/0044803 A1 | 2/2011 | Di Paola et al. | |
| 2011/0044804 A1 | 2/2011 | DiPaola et al. | |
| 2012/0195743 A1 | 8/2012 | Walunj et al. | |
| 2012/0275898 A1 | 11/2012 | McCaffrey et al. | |
| 2013/0017057 A1 | 1/2013 | Lagueux | |
| 2013/0022469 A1 | 1/2013 | McCaffrey | |
| 2013/0113168 A1 | 5/2013 | Lutjen et al. | |
| 2013/0209240 A1 | 8/2013 | McCaffrey | |
| 2014/0016761 A1 | 1/2014 | Werner | |
| 2014/0017072 A1 | 1/2014 | McCaffrey | |
| 2014/0023480 A1 | 1/2014 | McCaffrey | |
| 2014/0033149 A1 | 1/2014 | Groves et al. | |
| 2014/0044528 A1 | 2/2014 | Clouse | |
| 2014/0053040 A1 | 2/2014 | Hargan | |
| 2014/0127006 A1 | 5/2014 | Romanov et al. | |
| 2014/0133955 A1 | 5/2014 | McCaffrey et al. | |
| 2014/0186152 A1 | 7/2014 | McCaffrey et al. | |
| 2015/0016954 A1 | 1/2015 | Thibodeau et al. | |
| 2015/0031764 A1 | 1/2015 | Kraus et al. | |
| 2015/0226132 A1 | 8/2015 | Roy Thill et al. | |
| 2015/0337672 A1 | 11/2015 | McCaffrey et al. | |
| 2015/0369076 A1 | 12/2015 | McCaffrey et al. | |
| 2016/0003078 A1 | 1/2016 | Stevens et al. | |
| 2016/0003080 A1 | 1/2016 | Mcgarrah | |

FOREIGN PATENT DOCUMENTS

| | | |
|---|---|---|
| WO | 2015038906 | 3/2015 |
| WO | 2015047478 | 4/2015 |
| WO | 2015061108 | 4/2015 |
| WO | 2015088656 | 6/2015 |
| WO | 2015109292 | 7/2015 |
| WO | 2015112354 | 7/2015 |

OTHER PUBLICATIONS

Extended European Search Report for European Patent Application No. 17160082 completed Jul. 11, 2017.

* cited by examiner

TURBINE ENGINE BLADE OUTER AIR SEAL WITH LOAD-TRANSMITTING COVER PLATE

BACKGROUND

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged. The arc segments may be abradable to reduce the radial gap with the tips of the blades.

SUMMARY

A seal assembly according to an example of the present disclosure includes a seal arc segment defining radially inner and outer sides and first and second axial arc segment sides, a carriage carrying the seal arc segment, and a cover defining first and second axial cover sides. The second axial cover side is adjacent the first axial arc segment side.

In a further embodiment of any of the foregoing embodiments, the second axial cover side abuts the first axial arc segment side.

In a further embodiment of any of the foregoing embodiments, the cover abuts the carriage.

In a further embodiment of any of the foregoing embodiments, the second axial cover side includes at least one protrusion that abuts the first axial arc segment side.

In a further embodiment of any of the foregoing embodiments, the at least one protrusion is circumferentially elongated.

In a further embodiment of any of the foregoing embodiments, the at least one protrusion is arced.

In a further embodiment of any of the foregoing embodiments, the at least one protrusion includes first and second protrusions that are radially spaced apart.

In a further embodiment of any of the foregoing embodiments, the at least one protrusion includes a radial throughhole.

In a further embodiment of any of the foregoing embodiments, the first axial cover side includes a bearing surface.

In a further embodiment of any of the foregoing embodiments, the first axial cover side includes a coating.

In a further embodiment of any of the foregoing embodiments, the radially outer side of the seal arc segment includes radially-extending sidewalls defining a pocket, and the cover includes a portion disposed at least partially in the pocket.

In a further embodiment of any of the foregoing embodiments, the portion disposed at least partially in the pocket includes a manifold.

In a further embodiment of any of the foregoing embodiments, the seal arc segment defines first and second seal supports, and the carriage defines first and second support members that are circumferentially spaced apart from each other. The first support member supports the seal arc segment in a first ramped interface and the second support member supporting the seal arc segment in a second ramped interface such that the seal arc segment is circumferentially moveable with respect to the carriage.

In a further embodiment of any of the foregoing embodiments, the seal arc segment includes at least one of a ceramic material or a molybdenum-based alloy.

A gas turbine engine according to an example of the present disclosure includes a case disposed around a central axis, a vane structure disposed radially inwards of the case, at least one a seal arc segment defining radially inner and outer sides and first and second axial arc segment sides, at least one carriage mounted to the case and carrying the seal arc segment, and a cover defining first and second axial cover sides. The second axial cover side being adjacent the first axial arc segment side.

In a further embodiment of any of the foregoing embodiments, the vane structure abuts the first axial cover side.

In a further embodiment of any of the foregoing embodiments, the second axial cover side includes at least one protrusion that abuts the first axial arc segment side.

In a further embodiment of any of the foregoing embodiments, the at least one protrusion includes first and second protrusions that are radially spaced apart.

A method of assembling a seal assembly according to an example of the present disclosure includes installing a cover onto a seal arc segment. The seal arc segment defines radially inner and outer sides and first and second axial arc segment sides, and the cover defining first and second axial cover sides. The second axial cover side is adjacent the first axial arc segment side, and installs the cover and the seal arc segment into a carriage. The carriage carries the cover and the seal arc segment.

In a further embodiment of any of the foregoing embodiments, upon installing the cover onto the seal arc segment, the second axial cover side abuts the first axial arc segment side.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
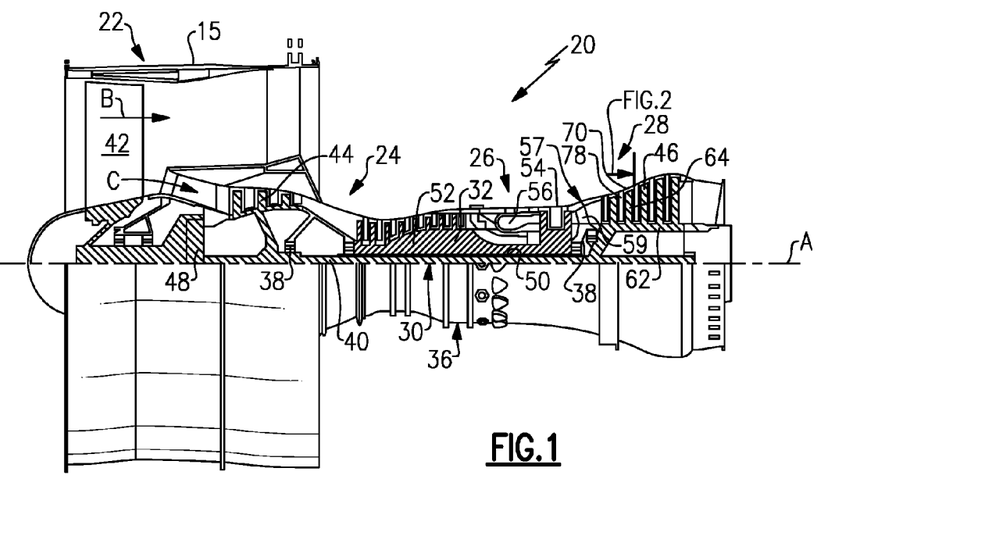
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram} \,^\circ \text{R})/(518.7^\circ \text{R})]^{0.5}$. The "Low corrected fan tip speed" as disclosed herein according to one non-limiting embodiment is less than about 1150 ft/second.

Figure 2:
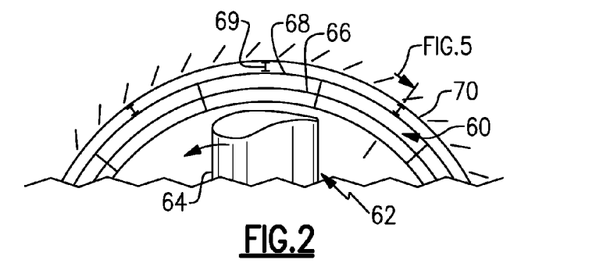
FIG. 2 illustrates an axial view of an example of a blade outer air seal of a gas turbine engine.

FIG. 2 illustrates a partial axial view through a portion of one of the stages of the turbine section 28. In this example, the turbine section 28 includes an annular blade outer air seal (BOAS) system or assembly 60 (hereafter BOAS 60) that is located radially outwards of a rotor 62 that has a row of rotor blades 64. As can be appreciated, the BOAS 60 can alternatively or additionally be adapted for other portions of the engine 20, such as the compressor section 24.

The BOAS 60 includes a plurality of seal arc segments 66 that are circumferentially arranged in an annulus around the central axis A of the engine 20. The seal arc segments 66 are mounted in a carriage 68, which may be continuous or segmented. The carriage 68 is mounted through one or more connections 69 to a case 70, which is disposed around the engine central longitudinal axis A. The BOAS 60 is in close radial proximity to the tips of the blades 64, to reduce the amount of gas flow that escapes around the blades 64.

Figure 3:
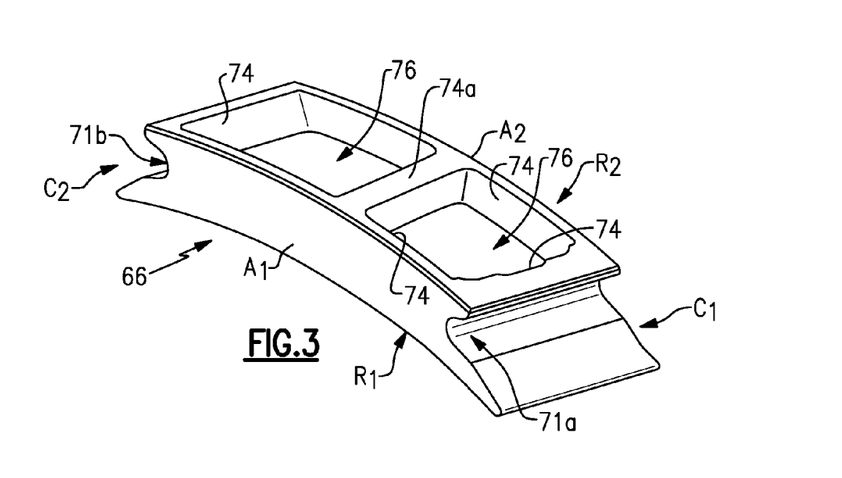
FIG. 3 illustrates an isolated view of an example of a seal arc segment of a blade outer air seal.
Figure 4:
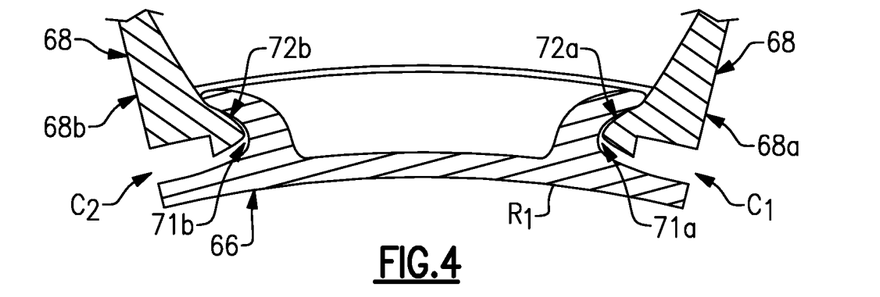
FIG. 4 illustrates a sectioned view of an example of a seal arc segment mounted in a carriage.

FIG. 3 illustrates an isolated view of a representative one of the seal arc segments 66, and FIG. 4 illustrates a radially sectioned view of the seal arc segment 66 mounted in a portion of the carriage 68. As will be appreciated, the examples herein may be used to provide compliant, low-stress mounting of the seal arc segment 66 in the carriage 68. In particular such compliant low-stress mounting may be useful for seal arc segments 66 formed of materials that are sensitive to stress concentrations, although this disclosure is not limited and other types of seals and materials will also benefit.

Although not limited, the seal arc segments 66 (i.e., the body thereof) may be monolithic bodies that are formed of a high thermal-resistance, low-toughness material. For example, the seal arc segments 66 may be formed of a high thermal-resistance low-toughness metallic alloy or a ceramic-based material, such as a monolithic ceramic or a ceramic matrix composite. One example of a high thermal-resistance low-toughness metallic alloy is a molybdenum-based alloy. Monolithic ceramics may be, but are not limited to, silicon carbide (SiC) or silicon nitride ($Si_3N_4$). Alternatively, the seal arc segments 66 may be formed of high-toughness material, such as but not limited to metallic alloys.

Each seal arc segment 66 is a body that defines radially inner and outer sides R1/R2, first and second circumferential ends C1/C2, and first and second axial sides A1/A2. The radially inner side R1 faces in a direction toward the engine central axis A. The radially inner side R1 is thus the gas path side of the seal arc segment 66 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In this example, the first and second circumferential ends C1/C2 define, respectively, circumferentially spaced-apart first and second seal supports 71a/71b by which the carriage 68 radially supports or carries the seal arc segment 66. The seal arc segment 66 is thus end-mounted. In the example shown, the first and second seal supports 71a/71b have a dovetail geometry.

The carriage 68 includes circumferentially spaced-apart first and second support members 68a/68b that serve to radially support the seal arc segment 66 at, respectively, the first and second seal supports 71a/71b. In the example shown, the first and second support members 68a/68b are hook supports that interfit with the dovetail geometry of the first and second seal supports 71a/71b.

The first support member 68a supports the seal arc segment 66 in a first ramped interface 72a and the second support member 68b supports the seal arc segment 66 in a second ramped interface 72b. For instance, each of the ramped interfaces 72a/72b includes at least one ramped surface on the seal arc segment 66, the carriage 68, or both. In the example shown, the surfaces of the first and second seal supports 71a/71b and the surfaces of the first and second support members 68a/68b are ramped. The term "ramped" as used herein refers to a support surface that is sloped with respect to both the radial and circumferential directions.

The ramped interfaces 72a/72b permit the seal arc segment 66 to move circumferentially with respect to the carriage 68 as the seal arc segment 66 slides up and down the ramped interfaces 72a/72b. Friction in the ramped interfaces 72a/72b during sliding movement can potentially provide damping, and the relatively large contact area across the ramped interfaces 72a/72b distributes loads transferred through the ramped interfaces 72a/72b, which also serves to potentially reduce stress concentrations on the seal arc segment 66.

In this example, the radially outer side R2 of the seal arc segment 66 includes radially-extending rails or sidewalls 74 (FIG. 3) that define a pocket 76 on the radially outer side R2 of the seal arc segment 66. The pocket 76 is open on its radially outer side. The pocket 76 serves to reduce the mass of the seal arc segment 66 and may be used to facilitate cooling of the seal arc segment 66. In this example, the seal arc segment 66 also includes a rib 74a that circumferentially subdivides the pocket 76. As can be appreciated given this disclosure, the geometry of the pocket 76 may be varied and may exclude any ribs, may include additional ribs, or may include other structures related to cooling and/or position control of the seal arc segment 66.

Figure 5:
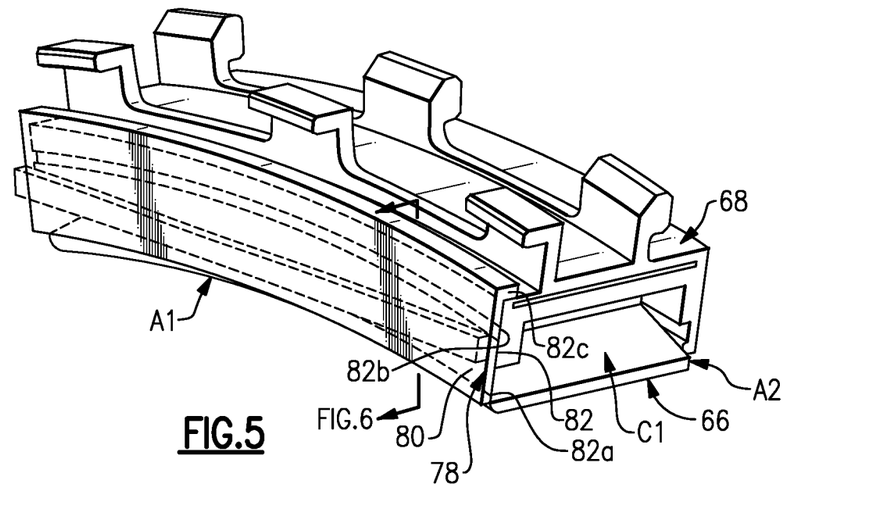
FIG. 5 illustrates an isolated view of an example of a blade outer air seal.
Figure 6:
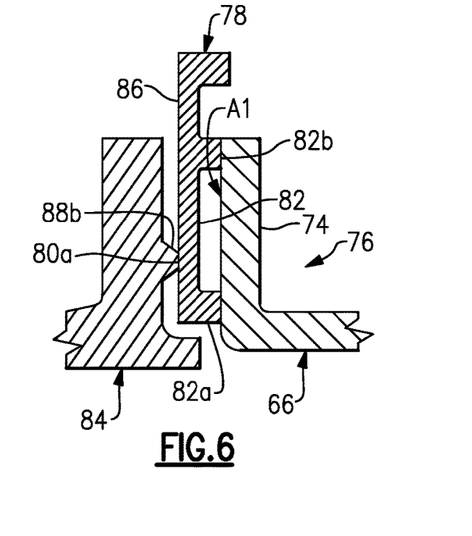
FIG. 6 illustrates a sectioned view of a portion of the blade outer air seal of FIG. 5.

FIG. 5 shows an isolated view of a portion of the BOAS 60, and FIG. 6 shows a sectioned view of a portion of the BOAS 60. The BOAS 60 includes a cover 78 that is disposed axially adjacent to the first axial side A1 of the seal arc segment 66. The cover 78 defines first and second axial cover sides 80/82. The second axial cover side 82 is adjacent the first axial side A1 of the seal arc segment 66. Most typically, the cover 78 will also be an arc segment such that each seal arc segment 66 of the BOAS 60 has one corresponding cover 78. As will be described in further detail, the cover 78 serves to distribute loads on the seal arc segment 66.

Figure 7:
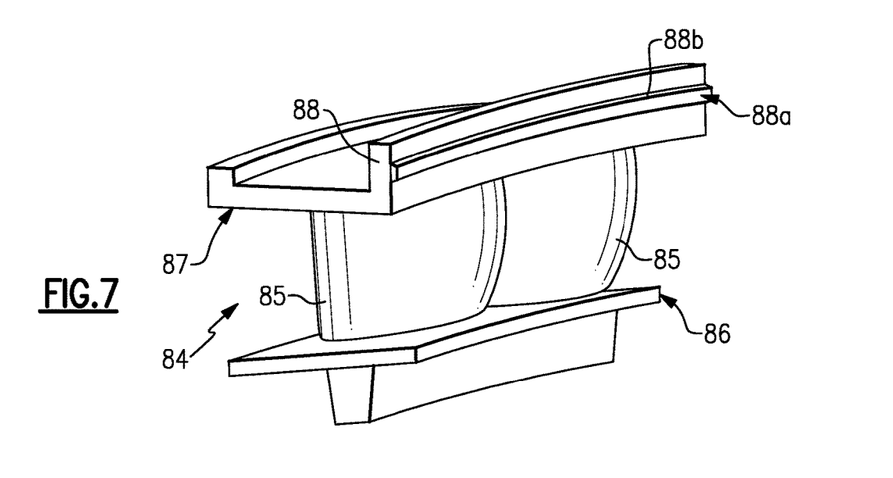
FIG. 7 illustrates an isolated view of a vane structure.

The cover 78 is located axially between the seal arc segment 66 and a vane structure 84. An isolated view of the vane structure 84 is shown in FIG. 7. In this example, the vane structure 84 is a vane doublet that includes two vane airfoils 85. Most typically, each seal arc segment 66 of the BOAS 60 has one corresponding vane structure 84. Thus, there may be an equal number of vane structures 84 and seal arc segments 66 and, by extension, an equal number of vane structures 84 and covers 78. The equal numbers of vane structures 84, seal arc segments 66, and covers 78 facilitates reducing variations of the loads on the seal arc segment 66.

The airfoils 85 extend radially between outer and inner platforms 86/87. The outer platform 87 includes a radially-extending wall 88 that defines an axial face 88a. The axial face 88a includes a chordal seal 88b. For example, the chordal seal 88b is an elongated ridge. The chordal seal 88b abuts a bearing surface region 80a of the first axial cover side 80. The bearing surface region 80a is the portion of the surface of the first axial cover side 80 that contacts the chordal seal 88b.

The vane structure 84 exerts the axial load on the cover 78 via the chordal seal 88b. In this regard, the cover 78 distributes at least a portion of the load over the seal arc segment 66. For example, the second axial cover side 82 includes at least one protrusion 82a that abuts the first axial side A1 of the seal arc segment 66. Although not limited, in the example shown in FIG. 5, the protrusion 82a is a circumferentially elongated arc that continuously abuts the first axial side A1 of the seal arc segment 66. The cover 78 distributes at least a portion of the load from the vane structure 84 over the area of contact between the protrusion 82a and the first axial side A1 of the seal arc segment 66, thereby reducing or avoiding load concentrations on the seal arc segment 66. The abutment between the protrusion 82a and the first axial side A1 may also serve as a seal to limit influx of hot gases from the core flow path C.

The cover 78 may include one or more additional protrusions, such as protrusion 82b. In this example, the protrusion 82b is radially spaced apart from protrusion 82a. Again, although not limited, the protrusion 82b is also a circumferentially elongated arc that continuously abuts the first axial side A1 of the seal arc segment 66.

In this example, the cover 78 also abuts the carriage 68. For instance, the cover 78 includes a third protrusion 82c located at a radially outer or outermost portion of the cover 78. The protrusion 82c serves as a hook that fits onto a portion of the carriage 68 to facilitate proper positioning of the cover with respect to the carriage 68 and the seal arc segment 66. The cover 78 may this also distribute at least a portion of the load into the carriage 68, thereby reducing or limiting the amount of load distributed to the seal arc segment 66.

Figure 8:
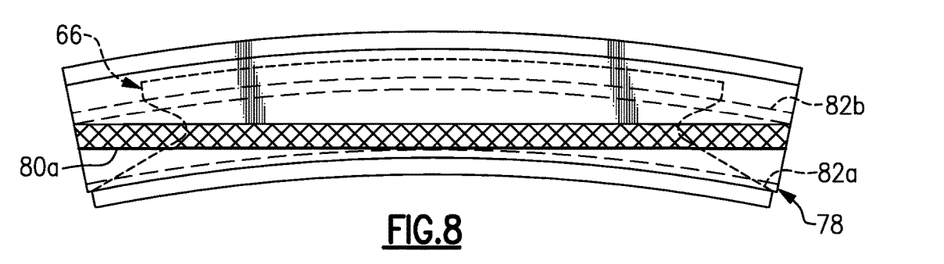
FIG. 8 illustrates an axial view of a cover and a seal arc segment of a blade outer air seal.

FIG. 8 illustrates an axial view of the cover 78 and the seal arc segment 66 (in phantom). The bearing surface region 80a in this example is radially between the arcs of the protrusions 82a/82b. Thus, loads applied by the vane structure 84 at the bearing surface region 80a are divided and more uniformly distributed to the protrusions 82a/82b rather than being concentrated on one of the protrusions 82a/82b.

Figure 9:
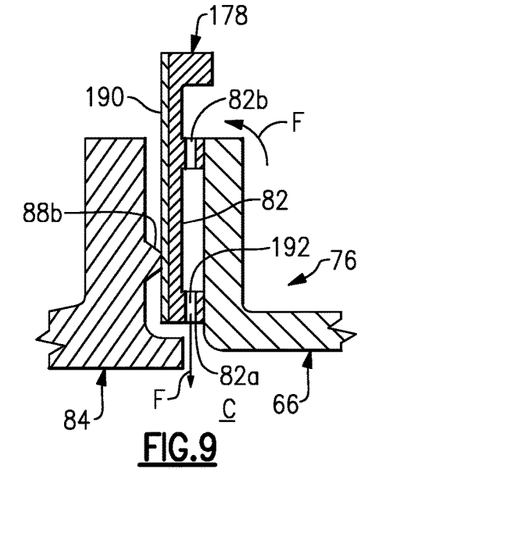
FIG. 9 illustrates a sectioned view of a portion of a blade outer air seal with a cover that has a coating.

FIG. 9 illustrates another example cover 178 that is similar to the cover 78 but additionally includes a coating 190 on the first axial cover side 80. As shown, the coating 190 may cover a substantial portion of the first axial cover side 80. Alternatively, the coating 190 may be on only the portion of the first axial cover side 80 that contacts the vane structure 84 (i.e., the area of the bearing surface region 80a). In another alternative, the coating 190 may fully or substantially fully cover all surfaces of the cover 178.

In one example, the coating 190 is a hardface coating that facilitates enhanced wear-resistance at the first axial cover side 80. Although not limited, the hardface coating may be a ceramic-based coating or a metal alloy-based coating that has greater hardness than the material from which the remainder of the cover 178 is formed. The cover 178 (or 78) may be formed of a metal alloy, such as but not limited to nickel-based alloys and cobalt-based alloys. In particular, if the seal arc segment 66 is formed of a silicon-based ceramic material, the cobalt-based alloy may provide better chemical compatibility with the ceramic in comparison to nickel-based alloys, for example. Nickel tends to have a higher reactivity with silicon in comparison to the reactivity of cobalt with silicon.

The cover 178 also includes one or more radial through-holes 192. In this example, the protrusion 82a includes the radial through-hole 192. The protrusion 82b may also include one or more of the radial through-holes 192. The radial through-holes 192 may serve as cooling passages for guiding cooling air flow F from the seal arc segment 66 or from (directly) the compressor section 24 into the core flow path C (e.g., for film cooling). For instance, cooling air flow may be provided to the pocket 76 for thermal management. The cooling air flow F may then be discharged from the pocket 76, around the sidewalls 74, and through the one or more radial through-holes 192 into the core flow path C.

Figure 10:
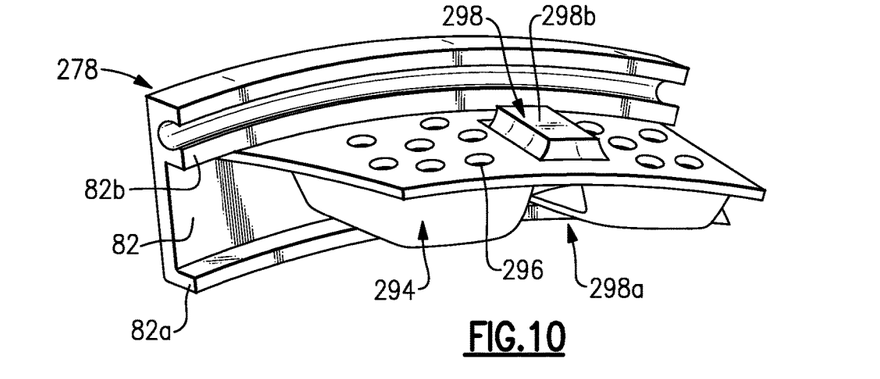
FIG. 10 illustrates an isolated view of another example of a cover of a blade outer air seal.

FIG. 10 illustrates another example cover 278 that is similar to the cover 78 but includes a manifold or other structure portion 294 that extends axially off of the second axial cover side 82. For instance, the portion 294 may be integrally formed with the remainder of the cover 278 or may be an initially separate piece that is secured to the remainder of the cover 278 by welding, brazing, fasteners, or combinations thereof.

Figure 11:
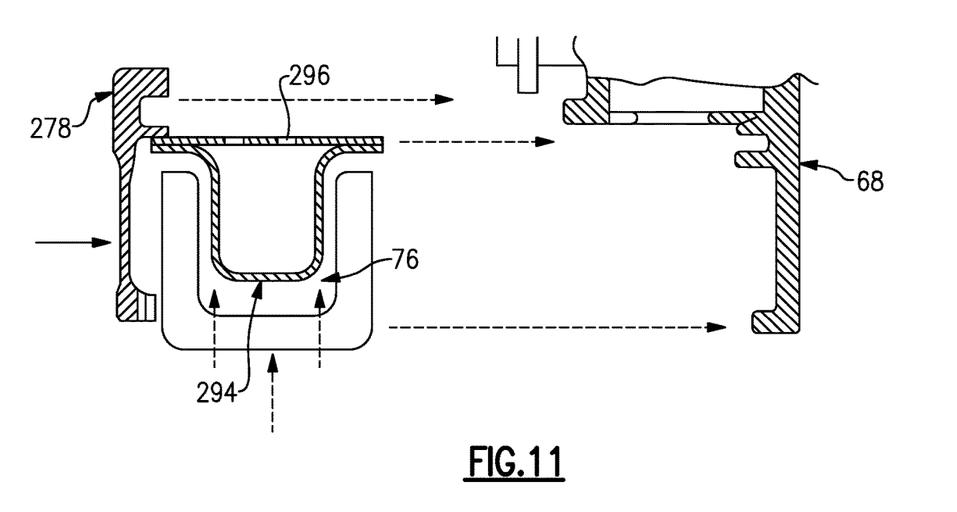
FIG. 11 depicts a method of assembling a blade outer air seal.

In this example, the portion 294 is a manifold that is disposed at least partially in the pocket 76 of the seal arc segment 66 (see FIG. 11). The manifold subdivides the pocket 76 and may serve to guide and distribute cooling air flow F in the pocket 76. For instance, the manifold includes one or more inlets 296 for receiving and distributing the cooling air flow F. In this example, the manifold also includes an integral centering structure 298. The centering structure 298 may include a slot 298a that fits over the rib 74a (FIG. 3) of the seal arc segment 66 and a key 298b that interlocks with a corresponding slot in the carriage 68. The interlocking between the slot 298a and the rib 74a, coupled with interlocking of the key 298b and the carriage 68 serves to limit circumferential movement of the seal arc segment 66.

FIG. 11 also depicts a method of assembling a BOAS. For example, the method may include installing the cover 278 onto the seal arc segment 66. It is to be appreciated that the method also extends to the cover 78 and 178. As an example, the seal arc segment 66 is installed radially to insert the portion 294 (if present) into the pocket 76. The cover 278 and the seal arc segment 66 are then installed as a module into the carriage 68 such that the carriage 68 carries the cover 278 and the seal arc segment 66. For instance, the seal arc segment 66 and cover 278 are installed axially such that the first and second seal supports 71a/71b slide into engagement with the first and second support members 68a/68b of the carriage 68 (FIG. 4).

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A seal assembly comprising:
    a seal arc segment defining radially inner and outer sides and first and second axial arc segment sides;
    a carriage carrying the seal arc segment; and
    a cover defining first and second axial cover sides, the second axial cover side being adjacent the first axial arc segment side, the second axial cover side including at least one protrusion that abuts the first axial arc segment side, and the at least one protrusion including a radial through-hole.

2. The seal assembly as recited in claim 1, wherein the cover abuts the carriage.

3. The seal assembly as recited in claim 1, wherein the at least one protrusion is circumferentially elongated.

4. The seal assembly as recited in claim 3, wherein the at least one protrusion is arced.

5. The seal assembly as recited in claim 1, wherein the at least one protrusion includes first and second protrusions that are radially spaced apart.

6. The seal assembly as recited in claim 1, wherein the first axial cover side includes a bearing surface.

7. The seal assembly as recited in claim 1, wherein the first axial cover side includes a coating.

8. The seal assembly as recited in claim 1, wherein the radially outer side of the seal arc segment includes radially-extending sidewalls defining a pocket, and the cover includes a portion disposed at least partially in the pocket.

9. The seal assembly as recited in claim 8, wherein the portion disposed at least partially in the pocket includes a manifold.

10. A seal assembly:
    a seal arc segment defining radially inner and outer sides and first and second axial arc segment sides;
    a carriage carrying the seal arc segment; and
    a cover defining first and second axial cover sides, the second axial cover side being adjacent the first axial arc segment side, wherein the seal arc segment defines first and second seal supports, and the carriage defines first and second support members that are circumferentially spaced apart from each other, the first support member supporting the seal arc segment in a first ramped interface and the second support member supporting the seal arc segment in a second ramped interface such that the seal arc segment is circumferentially moveable with respect to the carriage.

11. The seal assembly as recited in claim 1, wherein the seal arc segment includes at least one of a ceramic material or a molybdenum-based alloy.

12. A gas turbine engine comprising:
a case disposed around a central axis;
a vane structure disposed radially inwards of the case;
at least one a seal arc segment defining radially inner and outer sides and first and second axial arc segment sides;
at least one carriage mounted to the case and carrying the seal arc segment; and
a cover defining first and second axial cover sides, the second axial cover side being adjacent the first axial arc segment side, the second axial cover side including at least one protrusion that abuts the first axial arc segment side, and the at least one protrusion including a radial through-hole.

13. The gas turbine engine as recited in claim 12, wherein the vane structure abuts the first axial cover side.

14. The gas turbine engine as recited in claim 12, wherein the at least one protrusion includes first and second protrusions that are radially spaced apart.

15. A method of assembling a seal assembly, the method comprising:

installing a cover onto a seal arc segment, the seal arc segment defining radially inner and outer sides and first and second axial arc segment sides, and the cover defining first and second axial cover sides, the second axial cover side being adjacent the first axial arc segment side, the second axial cover side including at least one protrusion that abuts the first axial arc segment side, and the at least one protrusion including a radial through-hole; and installing the cover and the seal arc segment into a carriage, the carriage carrying the cover and the seal arc segment.

16. The method as recited in claim 15, wherein upon installing the cover onto the seal arc segment, the second axial cover side abuts the first axial arc segment side.

* * * * *